United States Patent [19]

Duke et al.

[11] Patent Number: 4,510,204

[45] Date of Patent: Apr. 9, 1985

[54] FILM-FORMING COMPOSITIONS OF NITRILE POLYMER LATEX BLENDS

[75] Inventors: June T. Duke, Chagrin Falls; Kenneth E. Samuels, Twin Lakes; Mary-Catherine Brown, Bedford Heights, all of Ohio

[73] Assignee: The Standard Oil Company, Cleveland, Ohio

[21] Appl. No.: 468,181

[22] Filed: Feb. 22, 1983

Related U.S. Application Data

[63] Continuation-in-part of Ser. No. 434,134, Oct. 13, 1982, abandoned.

[51] Int. Cl.³ .................... B05D 3/02; B32B 15/08; B32B 27/00
[52] U.S. Cl. .................. 428/463; 427/388.4; 524/515; 524/521
[58] Field of Search ................ 524/521, 515; 427/388.1, 388.4, 388.2, 385.5, 393.5; 428/461, 462, 463

[56] References Cited

U.S. PATENT DOCUMENTS

| | | | |
|---|---|---|---|
| 3,503,918 | 3/1970 | Le Sota et al. | 427/388.2 X |
| 3,616,166 | 10/1971 | Kelley | 524/521 X |
| 3,647,735 | 3/1972 | Brodnyan | 524/521 |
| 4,331,738 | 5/1982 | Kuan | 524/521 X |

FOREIGN PATENT DOCUMENTS

0813959 5/1969 Canada .................. 524/521

Primary Examiner—Michael R. Lusignan
Attorney, Agent, or Firm—Maky, Renner, Otto & Boisselle

[57] ABSTRACT

Blends comprising at least two aqueous nitrile resin latexes which differ in film forming characteristics and dry film properties are useful in many applications as protective coatings. These blends are particularly useful as corrosion resistant coatings for metal substrates.

30 Claims, 2 Drawing Figures

FILM-FORMING COMPOSITIONS OF NITRILE POLYMER LATEX BLENDS

REFERENCE TO RELATED APPLICATION

This application is a continuation-in-part of copending application Ser. No. 434,134, filed Oct. 13, 1982, and now abandoned.

BACKGROUND OF THE INVENTION

This invention relates to a film forming composition comprising a blend of at least two aqueous nitrile resin latexes which differ in film forming characteristics and in dry film properties with the resultant blend exhibiting surprisingly superior surface coating properties.

Synthetic copolymers and interpolymers of monomer mixtures comprising acrylonitrile and acrylate esters are well known and some of them have well-established commercial utility. Particularly useful are the high acrylonitrile copolymers containing 80% by weight or more of acrylonitrile and the low acrylonitrile copolymers containing 20% by weight or less of acrylonitrile. The high acrylonitrile copolymers and interpolymers are most generally used in the manufacture of synthetic fibers and the low acrylonitrile copolymers and interpolymers are useful as elastomers. More details concerning the state of the art of the aforementioned acrylonitrile interpolymers may be found, for instance, in U.S. Pat. Nos. 2,412,034, 2,558,396, 2,688,608, and 2,958,670, as well as Industrial and Engineering Chemistry, vol. 47, pages 1000 et seq. (1955), vol. 46, pages 1992 et seq. (1954), vol. 43, pages 2500 et seq. (1951), Journal of the Americal Chemical Society, vol. 65, pages 2067 et seq. (1943), and Rubber Age, February 1953, pages 636–637.

It is well known that it is difficult to prepare films at normal temperatures from a latex resulting from the polymerization or copolymerization of high proportions of acrylonitrile as disclosed in U.S. Pat. No. 3,047,522. Improved nitrile latexes have been described which are prepared by the polymerization of a major proportion of an olefinically unsaturated nitrile with a monomer component copolymerizable therewith optionally in the presence of preformed diene rubber. For example, see U.S. Pat. Nos. 3,426,102; 4,244,852; and 4,329,401. The high concentration of the nitrile component results in the film being an excellent oxygen barrier. Further advantages of a high nitrile film are hardness, toughness, abrasion resistance, solvent resistance and adhesion to metal substrates. However, these high nitrile latexes characteristically form films at rather high temperatures, and they require long times to produce films which are pin hole free.

When latex dispersions are intended to be used as coating materials, it is desirable that the glass transition temperature (Tg) of the resin phase be such that particle coalescence and film formation occur at temperatures conventionally used for the application and baking of surface coatings in commercial equipment. For energy conservation, the application and finishing temperatures should be as low as possible. The minimum temperature at which a latex coalesces and forms a continuous or integral film is referred to as the minimum film forming temperature (MFT).

Applicants have discovered that the film forming temperature and the time required to produce a film can be significantly lowered by blending a high nitrile latex with a second latex material that has a lower minimum film forming temperature (MFT) without the loss of the desirable and useful film properties.

SUMMARY OF THE DISCLOSURE

This invention relates to film forming compositions comprising a blend of: (A) a first resin latex comprising (i) a major proportion of an olefinically unsaturated nitrile monomer, and (ii) a minor proportion of at least one other olefinically unsaturated monomer which is copolymerizable with the nitrile and optionally (iii) a preformed diene rubber and (B) a second resin latex comprising (i) an olefinically unsaturated nitrile monomer, (ii) at least one other olefinically unsaturated monomer copolymerizable with the nitrile and optionally (iii) a preformed diene rubber, wherein the difference between the MFT of the first latex and the second latex is at least 10° C. and preferably at least 15° C. Preferably, the blend of resins in the composition comprises at least 50% by weight of the nitrile. The coatings obtained from these latex blends are particularly useful as corrosion resistant coatings for metal substrates.

DESCRIPTION OF THE PREFERRED EMBODIMENTS

High nitrile resins have many desirable and useful properties which are directly related to the concentration of the nitrile component. However higher concentrations of nitrile component also result in higher resin MFTs. Desirable properties achieved with high nitrile levels include impermeability to water vapor and oxygen for enhanced corrosion resistance, film hardness, film toughness, adhesion to metal substrates, abrasion resistance and solvent resistance. Because of the difficulties of achieving both optimum film formation characteristics and optimum properties, conventional coatings are frequently formulated to strike a compromise. It has been discovered that by a careful selection of resin latexes, the high film forming temperatures and/or the long times required to produce superior films from the latex of a hard, high nitrile resin can be significantly lowered by blending with a softer (lower MFT resin) material, without the loss of desirable and useful film properties.

The film forming compositions of the present invention comprise a mixture of (A.) A first resin latex comprising
  (i) a major proportion of an olefinically unsaturated nitrile monomer,
  (ii) a minor amount of at least one other olefinically unsaturated monomer which is copolymerizable with the nitrile, and (B.) A second resin latex comprising
  (i) an olefinically unsaturated nitrile monomer, and
  (ii) at least one other olefinically unsaturated monomer which is copolymerizable with the nitrile, wherein the difference between the MFT of the first and second latexes is at least 10° C.

Generally, the MFT of the second latex is at least 10° C. lower than the MFT of the first latex which contains a major amount of the nitrile. Preferably the difference in MFT of the two latexes is at least 15° C.

The olefinically unsaturated nitriles used in the first and second latexes of the present invention include the alpha, beta olefinically unsaturated mononitriles having the structure:

$$CH_2=C(R)-CN$$

wherein R is hydrogen, a lower alkyl group having from 1 to 4 carbon atoms or a halogen. Such compounds include acrylonitrile, alpha-chloro acrylonitrile, alpha-fluoro acrylonitrile, methacrylonitrile, ethyacrylonitrile and the like. The most preferred olefinically unsaturated nitriles useful in the present invention are acrylonitrile, methacrylonitrile and mixtures thereof.

The other olefinically unsaturated monomer may be any such monomer which is copolymerizable with the nitrile. Such useful monomers include one or more of the esters of olefinically unsaturated carboxylic acids, vinyl esters, vinyl ethers, vinyl ketones, alpha-olefins, vinyl aromatic monomers and others.

The esters of olefinically unsaturated carboxylic acids include the acrylate esters having the structure:

$$CH_2=C(R_1)-COOR_2$$

wherein $R_1$ is hydrogen, an alkyl group having from 1 to 8 carbon atoms or a halogen, and $R_2$ is an alkyl group having from about 1 to 30 carbon atoms and preferably 1 to 4 carbon atoms. Compounds of this type include methyl acrylate, ethyl acrylate, the propyl acrylates, the butyl acrylates, the amyl acrylates, the hexyl acrylates, 2-ethyl hexylacrylate, glycidyl acrylate, methyl methacrylate, ethyl methacrylate, the propyl methacrylates, the butyl methacrylates, the amyl methacrylates, the hexyl methacrylates, glycidyl methacrylate, methyl alpha-chloro acrylates, ethyl alpha-chloro acrylates and the like. Most preferred are the lower acrylates such as methyl acrylate and ethyl acrylate.

Alpha olefins which are useful in the present invention as the other monomer include olefins having from about 3 to 10 carbon atoms and characterized by the formula $$CH_2=C(R_3)(R_4)$$

wherein $R_3$ is hydrogen or an alkyl group of 1 to 7 carbon atoms and $R_4$ is an alkyl group having from 1 to 7 carbon atoms. Specific examples include propylene, 1-butene, 1-hexene, 1-octene, isobutylene, 2-methyl-1-butene, 2-methyl-1-pentene, 2-methyl-1-hexene, 2-methyl-1-heptene, 2-methyl-1-octene, 2-ethyl-1-butene, 2-propyl-1-pentene, etc. Most preferred is isobutylene.

Other useful olefinic monomers which are copolymerizable with the nitriles are the vinyl monomers such as the following: alpha, betaolefinically unsaturated carboxylic acids and their anhydrides including acrylic acid, methacrylic acid, alpha-chloro acrylic acid, alpha-bromo acrylic acid, alpha-cyano acrylic acid, maleic acid, maleic anhydride, alpha-chloro maleic acid, dichloromaleic anhydride, itaconic acid, sorbic acid and the like; the vinyl esters, such as vinyl acetate, vinyl propionate, the vinyl butyrates, isopropenyl acetate, isopropenyl propionate, the isopropenyl butyrates and the like; the vinyl ethers, such as methyl vinyl ether, ethyl vinyl ether, the propyl vinyl ethers, the butyl vinyl ethers, the amyl vinyl ethers, the hexyl vinyl ethers, cyclohexyl vinyl ether, phenyl vinyl ether, the heptyl vinyl ethers, the octyl vinyl ethers and the like; the vinyl halides such as vinyl chloride, vinyl fluoride, vinyl bromide, vinylidene chloride, vinylidene bromide, vinylidene fluoride, dichloro-difluoroethylene, chlorotrifluoroethylene, trifluoroethylene, chloroprene, and the like; olefins such as ethylene, propylene, butylenes, amylenes, hexylenes, heptylenes, octylenes, butadiene-1,3, isoprene, styrene, alpha-methyl styrene, alpha-chloro styrene, and the like; vinyl cyanides, such as methacrylonitrile, maleic dinitrile, fumaronitrile, vinylidene cyanide and the like; vinyl amides, such as acrylamide, N-methyl acrylamide, N-methyl methacrylamide, N,N-dimethyl acrylamide, N,N-dimethyl methacrylamide, N-t-butyl acrylamide, N-dodecyl acrylamide, N-phenyl acrylamide, N-vinyl pyrrolidone, and the like; vinyl amines, such as N-vinyl piperidine, the vinyl pyridines and the like; allyl esters, such as allyl acetate, allyl propionate, allyl butyrate, methallyl butyrate and the like.

The weight ratio of nitrile to other monomer in the first resin latex can be varied over a wide range depending upon the desired properties and upon the composition of the second latex. Generally, however, the polymerized monomer mixture in the first latex will comprise from about 50 to 100 percent by weight of the olefinically unsaturated nitrile and from about 0 to 50 percent by weight of at least one other olefinically unsaturated monomer which is copolymerizable with the nitrile. Preferably, the polymerized monomer mixture in the first latex comprises from about 60 to 95 percent by weight (and more preferably from 65 to 85 percent by weight) of the nitrile and from about 40 to 5 percent by weight of the other monomer which is preferably at least one acrylate ester of the type described above.

The second latex comprises an olefinically unsaturated nitrile, a monomer copolymerizable therewith and optionally a preformed diene elastomer such that the MFT of the second latex differs by at least 10° C. from the MFT of the first latex. Preferably, this difference in MFT's is at least 15° C. Normally, the nitrile content of the resin in said second latex is less than the nitrile content of the resin in said first latex in order to achieve a lower MFT. However, the nature of the comonomer may also affect the MFT of the two latexes. Generally the resin in the latex contains from 20 to 60 percent by weight of a nitrile and preferably 35% to 50% by weight of the nitrile.

The nitrile and copolymerizable monomer used in the second latex may be the same or different from the nitrile and copolymerizable monomer used in the first latex. The choice of nitriles and copolymerizable monomers used in the blends will be determined by the properties desired in film forming blend and, less importantly, economics.

The resin latexes useful in the film forming compositions of the invention can be prepared by any method known in the art. Preferably, these latexes are prepared by emulsion polymerization of a mixture of an olefinically unsaturated nitrile monomer and at least one other olefinically unsaturated monomer which is copolymerizable with the nitrile, optionally in the presence of a preformed diene elastomer component. This emulsion polymerization is carried out in an aqueous medium in the presence of an emulsifier and a free radical generating polymerization initiator at a temperature of from 0° to 100° C. in the substantial absence of molecular oxygen.

Suitable emulsifiers include fatty acid soaps such as sodium laurate; organic sulfates and sulfonates such as sodium lauryl sulfate, the alkali metal salts of sulfonated petroleum or paraffinic oils, the sodium salts of aromatic sulfonic acids such as the sodium salts of naphthalene sulfonic acids, the sodium salts of dodecane-1-sulfonic acid, octadecane-1-sulfonic acid, etc.; aralkyl sulfonates such as sodium isopropyl benzene sulfonate, sodium isobutyl naphthalene sulfonate, and alkali metal salts of polymerized alkyl naphthalene sulfonic acids; alkali metal and ammonium salts of sulfonated dicarboxylic acid esters and amides such as sodium dodecyl sulfosuccinate, sodium N-octadecyl sulfosuccinamate, the polyalkyl and polyalkaryl alkoxyalkylene phosphonate acids and salts more fully described in U.S. Pat. No. 2,853,471 the so-called cationic emulsifiers such as the salts of strong inorganic acids and organic bases containing long carbon chains, for instance, lauryl amine hydrochloride, the hydrochloride of diethylaminoethyl decylamine, trimethyl cetyl ammonium bromide, dodecyl trimethyl ammonium bromide, the diethyl cyclohexylamine salt of cetyl sulfonic ester and others may be used.

In addition to the above and other polar or ionic emulsifiers, still other materials which may be used, singly or in combination with one or more of the above types of emulsifiers include the so-called "nonionic" emulsifiers such as the polyether alcohols prepared by condensing ethylene or propylene oxide with higher alcohols, the fatty alkylamine condensates, the diglycol esters of lauric, oleic and stearic acids, and others. It is often desirable to add post-polymerization emulsifiers to the latices embodied herein for improved stability.

The catalyst, usually required for satisfactory polymerization rate, may be any of those commonly employed for the polymerization of nitrile or acrylate esters including the azo initiators such as azobisisobutyronitrile, the various peroxygen compounds such as hydrogen peroxide, benzoyl peroxide, pelargonyl peroxide, cumene hydroperoxide, tertiary butyl hydroperoxide, tertiary butyl diperphthalate, tertiary butyl perbenzoate, sodium, potassium and ammonium persulfate and others, such as those disclosed in U.S. Pat. Nos. 2,471,959 and 2,491,471. The azo initiators are preferred.

Also useful as polymerization initiators are the water-soluble peroxygen compounds such as hydrogen peroxide, and the sodium, potassium and ammonium persulfates, the water-soluble oxidation-reduction or "redox" types of catalysts and the heavy metal activated, water-soluble peroxygen and redox catalysts. Included in this preferred list are the water-soluble persulfates; the combination of one of the water-soluble peroxygen compounds such as potassium persulfate with a reducing substance such as a polyhydroxy phenol, an oxidizable sulphur compound such as sodium bisulfite, sodium sulfite and the like; the combination of a water-soluble peroxygen compound such as potassium persulfate and dimethylaminopropionitrile; the combination of a water-soluble peroxygen compound with a reducing sugar or with a combination of a dimercapto compound and a water-soluble ferricyanide compound and others. Heavy metal ions which greatly activate potassium persulfate and the redox catalyzed polymerizations include those of silver, copper, iron, cobalt, nickel and others. The preferred range of catalyst as above defined, is from about 0.01 to 5 parts by weight per one-hundred parts by weight of monomers.

While the polymerization may be carried out in the presence of air, the rate of reaction is ordinarily faster in the absence of oxygen and hence, polymerization in an evacuated vessel, at reflux, or under an inert atmosphere such as nitrogen or $CO_2$ is preferred. The temperatures at which the polymerization is carried out is not critical, and the temperature may be varied widely from $-30°$ C. to 100° C. or higher, though best results are generally obtained at a temperature of from about 0° C. to about 70° C. Although the pH of the polymerization system is not critical, it is preferred that a pH of about 6 be employed during the polymerization reaction. The polymer latex may be adjusted to any desired pH. The polymerization may be a batch polymerization or one or more of the components, i.e., monomers, catalyst, activator, emulsifier, water, etc. may be added incrementally or continuously during the polymerization reaction.

Still other substances which desirably may be incorporated into the reaction medium include mercaptan modifiers, butters, electrolyte salts (see "Synthetic Rubber," G. S. Whitby, John Wiley and Sons, Inc., New York, 1954, pp. 226 and 227), carbon black and other pigments and fillers in a manner well understood in the art.

The preparation of typical nitrile latexes is more fully described in U.S. Pat. Nos. 3,426,012; 3,586,737; and 3,763,278, the disclosures of which are hereby incorporated by reference.

The properties of the first and second latexes used in the present invention can be modified by conducting the polymerization reaction in the presence of a latex of a preformed diene elastomer. The diene elastomer, prepared by conventional techniques may be a homopolymer of a conjugated diene or a copolymer of a major proportion of a conjugated diene and a minor proportion of an olefinically unsaturated co-monomer. Generally the elastomer will contain from 50 to 90%, and preferably 60 to 80% of the diene.

The conjugated diene monomers useful in the present invention generally contain from 4 to 6 carbon atoms such as butadiene-1,3, isoprene, chloroprene, bromoprene, cyanoprene, 2,3-dimethyl-butadiene-1,3, 2-ethyl-butadiene-1,3, 2,3-diethyl-butadiene-1,3 and the like and others. Most preferred for the purpose of this invention are butadiene and isoprene because of their ready availability and their excellent copolymerization properties. The co-monomers useful in preparing the elastomers are preferably unsaturated nitriles, vinyl aromatic compounds and acrylic compounds. Examples of the nitriles include acrylonitrile, methacrylonitrile, etc. Examples of vinyl aromatic compounds include the styrene and substituted styrenes such as alpha-methyl styrene, alpha-ethyl styrene, the vinyl toluenes, the vinyl xylenes, etc. The acrylic compounds may be any of the acrylic compounds described above as one of the monomers copolymerizable with the nitrile in the first step. Examples include methyl acrylate, ethyl acrylate, methyl methacrylate, etc.

As mentioned, the diene elastomer latexes useful in this invention are described in the art. For example, latexes of 1,3-butadieneacrylonitrile copolymers are described in U.S. Pat. Nos. 3,763,278 and 3,426,102, and latexes of dienes with styrene are described in U.S. Pat.

No. 3,763,278. The following examples illustrate typical preparations of elastomer latexes useful in the invention. Unless otherwise indicated the parts listed are parts by weight per 100 parts of monomer.

Diene Elastomer Latex A

An acrylonitrile-butadiene copolymer elastomer latex is prepared using the following ingredients:

|  | Parts |
| --- | --- |
| Acrylonitrile | 30 |
| Butadiene-1,3 | 70 |
| t-Dodecyl mercaptan | 0.65 |
| Soap flakes[1] | 1.40 |
| Azobisisobutyronitrile | 0.40 |
| Water | 200 |

[1]Product of the saponification of T-11 fatty acid (Procter and Gamble) with NaOH.

The polymerization is carried out with continuous agitation at 50° C. in the substantial absence of oxygen for 12 hours to a conversion of 92%. The final latex has a total solids of 29.6 percent by weight.

Diene Elastomer Latex B

A rubber latex is prepared at 45° C. in the substantial absence of oxygen for a period of 8 to 10 hours employing a mixture of the following ingredients:

|  | Parts |
| --- | --- |
| Acrylonitrile | 40 |
| Butadiene-1,3 | 60 |
| Emulsifier | 2.4 |
| Potassium persulfate | 0.1 |
| t-Dodecyl mercaptan | 0.5 |
| Water | 200.0 |

The pH is adjusted to about 8 with ammonium hydroxide. At the end of the reaction a latex having 33% total solids in 97% conversion of monomers to polymer is obtained.

The amount of the preformed diene elastomer incorporated into first and second latexes can vary over a wide range depending on the properties desired in the final latex blend. The amount of diene elastomer in each latex may be as high as 40 parts by weight on a solid basis based on 100 parts of monomer, but is generally below 20 parts by weight per 100 parts of monomer. Similarly the amount of diene elastomer in the film forming latex compositions of the invention (the blend) may be as high as 30 to 40 parts by weight on a solids basis and is generally below 20 parts by weight.

The following examples illustrate the preparation of latexes useful as the first or second latexes in the preparation of the film forming compositions of the invention. In the following illustrative examples, the amounts of ingredients used are expressed in parts by weight unless otherwise indicated. Minimum film-forming temperatures (MFT) are determined using a 30-inch long bar constructed of brass with chrome plated surface having a heating means at one end, and a cooling means at the other. The latex is cast upon the bar and the temperature at the various parts along the bar is continuously determined by means of thermocouples. The temperature (minimum) at which the latex blend coalesces and forms an integral film formed is recorded as the MFT. For some of the blends of this invention as illustrated below an initial film coalescence (MFT) occurs at temperatures below that needed for ultimate clear and tough film formation (noted at UFT). In some of the following examples where this phenomenon occurs, both temperatures are noted. For additional information concerning minimum filming temperature testing, see "Journal of Applied Polymer Science", Vol. 4, pages 81-85 (1960). Descriptions of film properties in general are based on observations of a 2.5-3 mil film.

Latex C

A high impact gas barrier resin latex is prepared by polymerization of a mixture of the following ingredients:

|  | Parts |
| --- | --- |
| acrylonitrile | 75.00 |
| methyl acrylate | 25.00 |
| latex A (above) | 35.00 |
| potassium persulfate | 0.06 |
| polyvinyl pyrrolidone | 0.40 |
| mercaptan[1] | 1.50 |
| doss[2] | 0.9 |
| water | 220.00 |

[1]pentaerythritol tetra-kis 3-mercaptopropionate
[2]sodium salt of dioctylsulfosuccinate The polymerization is carried out in the substantial absence of oxygen at 60° C. for 5 hours so as to produce a conversion of 95% in a latex having 32.5% solids. The average particle size of the resin is about 2000 Å; and the MFT is about 61.5° C.

Latex D

A latex is prepared similar to Latex C except that 80 parts of acrylonitrile, and 20 parts of ethyl acrylate are used in place of the methyl acrylate. The resultant latex has a MFT of 68° C.

Latex E

A high impact gas barrier latex is prepared by the procedure of Latex C except that 50 parts of acrylonitrile, 50 parts of ethyl acrylate rather the 25 parts of methyl acrylate and 23.65 parts of Latex A are used. A reduced water charged is used so that the resultant latex contains 35% total solids. The average particle size is about 1800 Å; and the MFT is about 34° C.

Latex F

A latex is prepared by the procedure used in preparing Latex E except that no Latex A is included in the formulation. The average particle size of this latex is about 500 Å, and the MFT is about 34° C.

Latex G

A latex is prepared by the procedure used in preparing Latex E except that 20 parts of acrylonitrile, 80 parts of ethyl acrylate and 23.65 parts of Latex A is used in the formulation. The resulting latex has an MFT of less than 10° C.

The first and second latexes can be blended in any ratio such as from 90 parts of the first latex and 10 parts of the second up to 10 parts of the first latex to 90 parts of the second, normally it is preferred that the resultant blend comprise at least 50% of said first latex. It is also preferred that the resins in the blended latexes comprise overall at least 50% by weight of a nitrile. Other nitrile containing resin latexes can be blended to said first and second latexes described above. Moreover, even small amounts of a non-nitrile containing resin latex can be blended with nitrile latexes provided this non-nitrile latex, is compatible with the nitrile latexes. The amount of such non-nitrile containing resin latex that can be used for blending will vary widely depending upon its composition.

It will be readily apparent to those skilled in the art that the film forming compositions of this invention may be further modified by the addition to the latex blend of plasticizers, stabilizers, thickness pigments, dispersants, defoamers, surfactants, extenders, adhesion agents, coalescing agents and other film formers. An example of a coalescing agent useful in the compositions of this invention is dimethyl formamide (DMF).

The following examples illustrate the preparation of the film-forming compositions of the invention. Unless otherwise indicated, all parts are by weight.

EXAMPLE 1

Latexes C and E are blended over ranges varying from 90/10 to 10/90 (dry solids weight basis). The blending is accomplished by weighing a quantity of each latex so as to contain the desired amount of resin, combining the latexes and mixing for 15 minutes. Film forming characteristics are evaluated on a temperature gradient bar with the hot end controlled at 63° C. and the cold end at 10° C. The film forming characteristics of these blends are summarized in Table I and FIG. 1.

As mentioned above, some of the blends prepared in this manner form an initial coalesced film on the bar at a relatively low temperature (MFT) which is an integral and removable film, and this initial film is thereafter convertible to a hard tough film at the higher temperature. This second temperature determination is included in Table I as UFT (ultimate film forming temperature). This characteristic of some of the blends is a further advantage of the film-forming composition of the invention. It has generally been observed that when latexes of hard resin films such as Latex C alone are dried below the MFT, loose, powdery layers are formed which, upon heating to a higher temperature, do not form a continuous film. Thus, baking conditions must be carefully controlled, and product losses may result in a continuous commercial coating line if line interruptions occur which expose latex films to temperatures below their MFT. With some of the blends of the example, initial coalescence occurs at a low temperature which upon further heating results in a satisfactory ultimate uniform film.

TABLE I

| MFT OF LATEX BLENDS | | |
|---|---|---|
| Latex Blend Ratio (C/E) | MFT (°C.) | UFT (°C.) |
| 100/0 | 61.5 | 61.5 |
| 90/10 | 58 | 58 |
| 80/20 | 58 | 58 |
| 70/30 | 42 | 56 |
| 60/40 | 39 | 53 |
| 50/50 | 39 | 48 |
| 40/60 | 37 | 39 |
| 30/70 | 37 | 39 |
| 20/80 | 35 | 36 |
| 10/90 | 34 | 36 |
| 0/100 | 34 | 34 |

Figure 1:
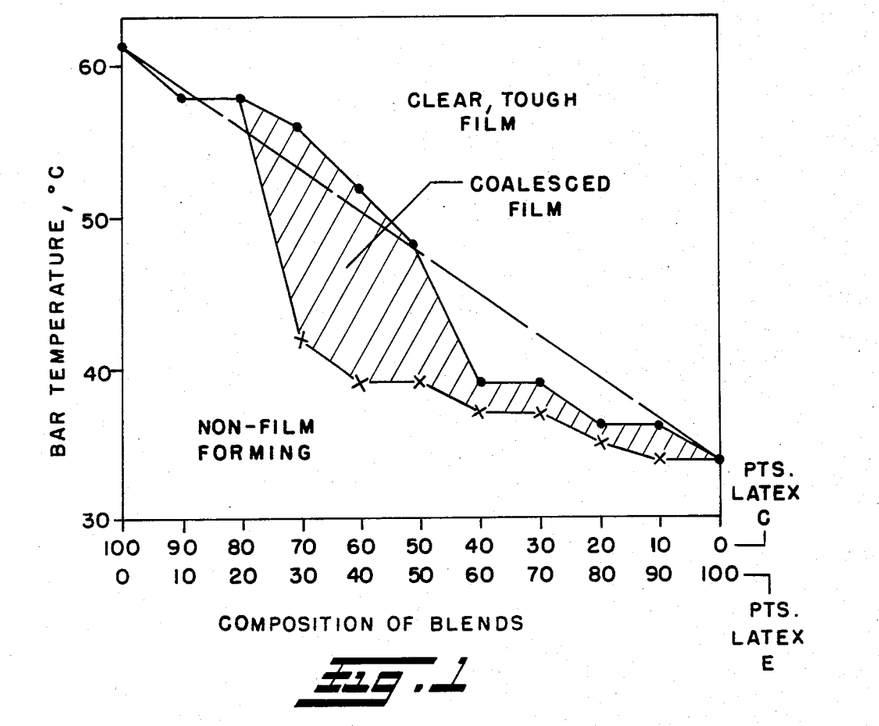
FIG. 1 is a graph showing the MFT and the minimum temperature at which a hard film is formed for various blends, and for some blends, the existance of a temperature range wherein the film exists as a coalesced film until heated to a higher temperature to form the ultimate film of desired hardness.

In FIG. 1, the area below the line connecting the MFT's is labeled as non-film forming. In this range of temperatures, loose, powdery layers are formed in lieu of the desired coalesced integral film. In those blends where there is observed an MFT and a UFT, the area between the MFT and UFT is labeled to indicate the formation and existence of a coalesced film at the indicated temperatures. At or above the MFT, clear, tough films are formed. As can be seen from Table I and FIG. 1, the MFT and UFT is one and the same temperature (61.5° C.) for Latex C. The MFT and UFT for the blend of 90 parts Latex C and 0.10 parts of Latex E also is at one temperature, namely 58° C. Thus for Latex C and the 90/10 blend, the film initially formed is a clear tough film.

EXAMPLE 2

Figure 2:
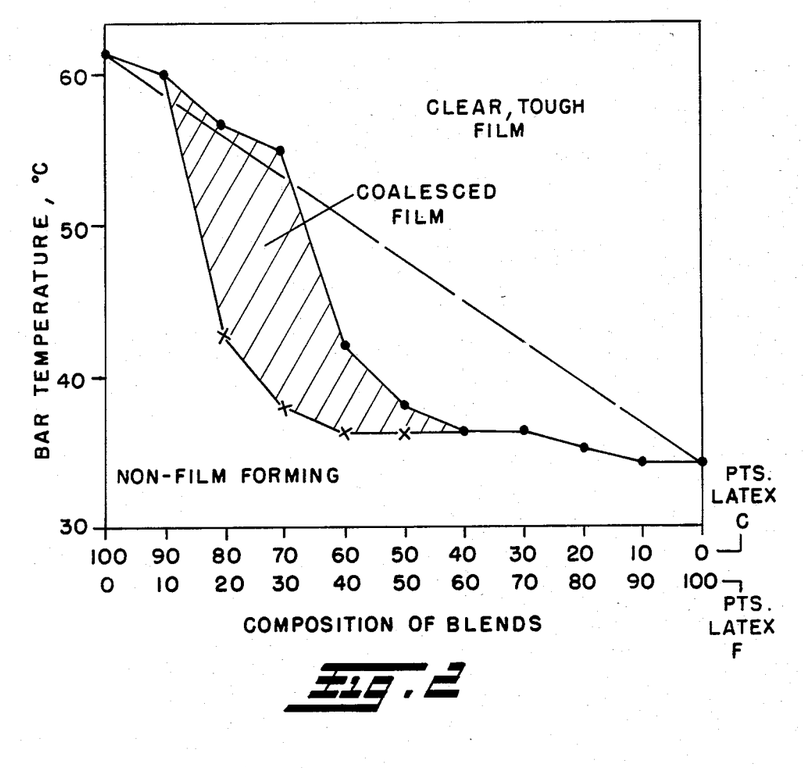
FIG. 2 is a graph similar to the graph of FIG. 1 but with a different blend of latexes in accordance with the invention.

The procedure of Example 1 is repeated using a blend of Latex C and Latex F. The MFT and UFT of these blends are summarized in Table II and FIG. II.

TABLE II

| Latex Blend Ratios (C/F) | MFT (°C.) | UFT (°C.) |
|---|---|---|
| 100/0 | 61.5 | 61.5 |
| 90/10 | 60 | 60 |
| 80/20 | 43 | 56.5 |
| 70/30 | 38 | 55 |
| 60/40 | 36 | 42 |
| 50/50 | 36 | 38 |
| 40/60 | 36 | 36 |
| 30/70 | 36 | 36 |
| 20/80 | 35 | 35 |
| 10/90 | 34 | 34 |
| 0/100 | 34 | 34 |

The MFT's of the film-forming compositions obtained in Examples 1 and 2 do not reflect the straight line average of the two components which might be expected. Instead, the MFT's of the blends generally are less than expected. This difference between the expected MFT's and the actual MFT's provides an additional region of application usefulness. Variation in latex particle size of the blend components offers a further means of altering film formation characteristics.

EXAMPLE 3

A blend is prepared in accordance with the general procedure of Example 1 using Latex D and Latex G in amounts to provide an overall resin composition of 50 parts acrylonitrile and 50 parts of ethyl acrylate and about 8.5 parts of elastomer (from Latex A). This blend forms a continuous film over the length of the test bar, and the MFT is less than 5° C. The film can be removed from the bar without tearing or crumbling, and no powdering or flaking is observed.

In comparison, a copolymer latex of essentially the same composition, 50 parts acrylonitrile, 50 parts ethyl acrylate and about 7 parts of elastomer of Latex A polymerized directly is found to have an MFT of 34° C. Below this temperature, powdering and flaking from the bar occurs.

EXAMPLE 4

A thickener (0.6 parts of a polyvinyl pyrrolidine compound-Rohm and Haas E-845) is added to Latex C and Latex E. The modified latexes are blended in various weight ratios by vigorous agitation. Dimethylformamide (DMF) is added to some of the blends in an amount equal to a coalescent level of 20% based on latex resin solids. The film forming latex compositions prepared in this manner are summarized in Table III.

TABLE III

LATEX BLENDS

| Blend | Blend Ratio C/E | Coalescent Level (%) |
| --- | --- | --- |
| 4A | 90/10 | 0 |
| 4B | 90/10 | 20 |
| 4C | 80/20 | 0 |
| 4D | 80/20 | 20 |

These film-forming compositions are useful for wide variety of coating applications. For example, substrates comprising metal, wood and paper can be coated by the instant coating. However, when coating a metal surface, it is preferred that the metal be first treated with an etching material such as a mineral acid to thoroughly clean said surface. The film-forming composition can be applied to the substrate by means of a doctor knife or water bar, airless spray, a roller coater, a conventional or electrostatic air spray gun, by dipping the substrate into the coating formulation by flow coating, electrodeposition or by other means known to those skilled in the art.

After the film-forming composition has been applied to the substrate, it is dried at a temperature between room temperature and 500° C. The drying temperature and procedure will vary depending upon the composition. One method of drying the coatings is to go through a double bake cycle. For example, first bake may be at a temperature of about 25° C. to 180° C., preferably at 85° C. to 160° C. for from 1 second to 60 minutes, more preferably 4 to 8 minutes. This first bake evaporates most of the water and aids in good film formation. The second bake is conducted at a higher temperature, such as from about 140° to 500° C., preferably from 160° to 240° C. for from 1 second to 60 minutes. The second bake completes the fusion of the film particles and removes substantially all of the volatiles. The drying temperatures closely relate to the drying time and it is important not to dry these coatings too long at an elevated temperature or substantial degradation will occur.

Another method of drying the coatings is to go through a single cycle bake. The bake cycle is at a temperature of about 25° C. to 600° C. more preferably 100° C. to 400° C. for 1 second to 60 minutes, more preferably 1 second to 90 seconds.

The choice of bake cycle will depend on the method of application, baking conditions (time/temperature), dry film thickness, total solids of the coating and other factors. Generally thin films of less than 0.6 mils can be baked in a single cycle while relatively thicker films of about 0.6 to 2.0 mils or more will require a double-cycle bake or a temperature programmed oven.

It is well known in the metal finishing art that metal surfaces such as aluminum, ferrous, and zinc surfaces may be provided with an inorganic phosphate coating by contacting them with an aqueous phosphating solution. The phosphate coating protects the metal surface to a limited extent against corrosion and serves primarily as an excellent base for the later application of film-forming coating compositions such as paint, lacquer, varnish, primers, synthetic resins, enamel, and the like.

The inorganic phosphate coatings generally are formed on a metal surface by means of aqueous solutions which contain phosphate ion and, optionally, certain auxiliary ions including metallic ions such as sodium, manganese, zinc, cadmium, copper, lead, and antimony ions. These aqueous solutions also may contain nonmetallic ions such as ammonium, chloride, bromide, fluoride, nitrate, sulfate, and borate ions. These auxiliary ions influence the reaction with the metal surface, modify the charater of the phosphate coating, and adapt it for a wide variety of applications. Other auxiliary agents such as oxidizing agents, coloring agents, and metal cleaning agents also may be incorporated in the phosphating solution.

As mentioned above, the inorganic phosphate coatings have been found to provide an excellent base for the application of siccative organic coatings such as paints or lacquers. The provision of such phosphate coatings has been found to improve both the adhesion of the paint or lacquer film to the metal surface and the corrosion resistance of the painted metal.

The preparation and use of aqueous phosphating solutions is well known in the metal finishing art as shown by U.S. Pat. Nos. 1,206,075; 1,485,025; 2,001,754; 2,859,145; 3,090,709; 3,104,177; 3,307,979 and 3,458,364.

By way of illustration of the utility of the film forming composition of the invention, phosphated steel panels (Bonderite 40-trademark of Oxymetals Division of Parker Industries, Inc.) were coated with blends of the various latexes described in Example 4. These coatings were applied with conventional air spray equipment. All the coatings were baked initially at 135°–140° C. for 4 minutes and then given a rebake at times varying from 30 seconds to 45 minutes and at temperatures of from 160°–275° C. The film thicknesses of these coatings were 0.8 to 1.2 mils.

Various tests were performed on these coated panels. In the salt spray test, all the coated panels were placed in the salt spray cabinet for 240 hours. This test is an ASTM accelerated corrosion test (ASTM-B117-74) under the conditions of 5% salt spray and 95% relative humidity at 95° F. Different end use environments and coating economics will specify that a coating survive a certain salt spray exposure time. Exposed panels were given a numerical rating from 0 (poor-failure) to 10 (perfect-no rust).

The drop impact test evaluates the coating adhesion to metal substrates when subjected to impact forces (ASTM D2794). A standard weight (2 or 4 pounds) is dropped at predetermined distance and strikes an indenter that deforms the coating and substrate. The coated panels are tested at various impact values and the lowest impact at which loss of adhesion occurs is noted. The coated panels are impacted on both the coated side (direct impact) and the back side of the panel (reverse impact). A special tape is applied to the impacted area of coating and then removed abruptly. If 4 square milimeters or less of the coating is removed by the tape, the coatings have passed that specific impact value. The maximum drop impact value in this test was 160 inch-lbs.

The pencil hardness test evaluates the coatings film hardness when subjected to scratching by lead pencils (ASTM D3363). Standard lead pencils in various lead softness (6B—very soft lead and 8H—very hard lead) are placed on the surface of the film. Keeping the pencil at a 45° angle, one attempts to mar the paint film by using successively harder pencils until the film is scratched. At this point, the lead which first scratched the film is considered to be the film's pencil hardness. Ratings of 6B indicate the film is very soft. Ratings of 8H would indicate extremely hard film.

The results of such testing on some phosphated panels coated with the composition of Example 4 are summarized in Table IV. The results are those observed using Bonderite 40 panels, a film thickness of 0.8 to 1.2 mils and an initial bake of 135°–140° C. and a rebate at 200° C. for 15 minutes.

TABLE IV

| Composition of Example | FILM PROPERTIES | | |
|---|---|---|---|
| | Corrosion Rating | Impact Strength (Direct/Reverse) | Pencil Hardness |
| 4A | 9 | 160/160 | 8H |
| 4B | 9 | 110/100 | 8H |
| 4C | 9 | 160/160 | 8H |
| 4D | 9 | 160/160 | 8H |

The results of the testing demonstrate the utility of the film forming compositions of the invention.

Although only a few embodiments of this invention have been specifically described above, it should be appreciated that many additions and modifications can be made without departing from the spirit and scope of the invention. These and all other modifications are intended to be within the scope of this invention, which is to be limited only by the following claims.

We claim:

1. A film forming composition comprising a mixture of
   (A) a first resin latex comprising
      (i) a major proportion of an olefinically unsaturated nitrile monomer,
      (ii) a minor amount of at least one other olefinically unsaturated monomer which is copolymerizable with the nitrile, and
   (B) a second resin latex comprising
      (i) about 20 to 60% of an olefinically unsaturated nitrile monomer, and
      (ii) at least one other olefinically unsaturated monomer which is copolymerizable with the nitrile,
   wherein the difference between the MFT of the first and second latexes is at least 10° C., and the weight ratio of the first latex to the second latex is from about 90/10 to 10/90.

2. The composition of claim 1 wherein the first and second latexes contain from 0 to 40 parts by weight on a solids basis, based on 100 parts on a solids basis of the combination of (i) and (ii) in each latex, of a preformed homopolymer of a conjugated diene or a copolymer comprising a major proportion of a conjugated diene and a minor proportion of an olefinically unsaturated comonomer.

3. The composition of claim 1 wherein the difference between the MFT of the first and second resin latexes is at least 15° C.

4. The composition of claim 1 wherein the polymerized monomer mixture in the first resin latex contains at least 55% by weight of the unsaturated nitrile.

5. The composition of claim 1 wherein the polymerized monomer mixture in the first resin latex contains from about 60 to about 95 percent by weight of an olefinically unsaturated nitrile monomer.

6. The composition of claim 1 wherein the olefinically unsaturated nitrile in the first and second latex has the formula $$CH_2=C(R)-CN$$

wherein R is hydrogen, a lower alkyl group containing up to 4 carbon atoms or a halogen.

7. The composition of claim 6 wherein the nitrile in the first and second latexes is acrylonitrile.

8. The composition of claim 1 wherein the other olefinically unsaturated monomers in the first and second latexes are each independently selected from the group consisting of acrylate esters, alpha olefins, vinyl ethers, vinyl esters, and vinyl aromatic compounds.

9. The composition of claim 8 wherein the monomer is an acrylic ester having the formula $$CH_2=C(R_1)-COOR_2$$

wherein $R_1$ is hydrogen, an alkyl group having from about 1 to 8 carbon atoms or a halogen, and $R_2$ is an alkyl group having from 1 to 30 carbon atoms.

10. The composition of claim 9 wherein the acrylate ester is methyl or ethyl or a mixture thereof.

11. The composition of claim 8 wherein the alpha olefin has the structure $$CH_2=CR_3R_4$$

wherein $R_3$ is hydrogen or an alkyl group having from one to 7 carbon atoms, and $R_4$ is an alkyl group of one to 7 carbon atoms.

12. A film forming composition comprising a mixture of
   (A) a first resin latex comprising a major proportion of a nitrile monomer having the formula $$CH_2=C(R)-CN$$

wherein R is hydrogen, a lower alkyl group having from 1 to 4 carbon atoms or a halogen, and
      (ii) a minor amount of at least one acrylate ester having a formula $$CH_2=C(R_1)-COOR_2$$

wherein $R_1$ is hydrogen, an alkyl group having from 1 to 8 carbon atoms or a halogen, and $R_2$ is an alkyl group having from 1 to about 30 carbon atoms and preferably 1 to about 4 carbon atoms, and
   (B) a second resin latex comprising
      (i) about 20 to 60% of a nitrile monomer having the formula $$CH_2=C(R)-CN$$

wherein R is as defined above, and
      (ii) an acrylate ester having the formula $$CH_2=C(R_1)-COOR_2$$

wherein $R_1$ and $R_2$ are as defined above, wherein the difference between the MFT of the first and second latexes is at least 10° C., and the weight ratio of the first latex to the second latex is from about 90/10 to 10/90.

13. The composition of claim 12 wherein the first and second latexes can each independently contain from 0 to about 40 parts by weight on a solids basis, based on 100 parts of polymer in each latex, of a preformed homopolymer of a conjugated diene or a copolymer comprising a major proportion of a conjugated diene and a minor proportion of an olefinically unsaturated comonomer.

14. The composition of claim 12 wherein the polymerized monomer mixture in the first resin latex comprises from about 50 to 95 percent by weight of the nitrile and from 5 to 50 parts by weight of the acrylate ester.

15. The composition of claim 12 wherein the polymerized monomer mixture in the second resin latex comprises from about 20 to 60 percent by weight of the nitrile and from about 80 to 40 percent by weight of the acrylate.

16. The composition of claim 12 wherein the nitrile in the first and second latex is acrylonitrile.

17. The composition of claim 12 wherein the acrylates in the first and second latexes are each independently methyl acrylate, ethyl acrylate or a mixture thereof.

18. The composition of claim 12 wherein the polymerized monomer mixture in the first resin latex comprises from about 65 to 85 percent by weight of at least one nitrile.

19. The composition of claim 12 wherein the polymerized monomer mixture in the second latex comprises from about 35 to 60 percent by weight of at least one nitrile.

20. The composition of claim 12 wherein more than 50 percent by weight of the composition comprises the first resin latex.

21. The composition of claim 12 wherein the nitrile content in the composition is more than 50 percent by weight, based on the total resin solids.

22. The composition of claim 12 wherein the MFT of the first resin latex is at least 15° higher than the MFT of the second resin latex.

23. A method of preparing a film comprising the steps of
(A) blending a first resin latex produced by the polymerization of a major proportion of an olefinically unsaturated nitrile monomer and a minor proportion of at least one other olefinically unsaturated monomer which is copolymerizable with the nitrile and a second resin latex produced by the polymerization of an olefinically unsaturated nitrile monomer and at least one other olefinically unsaturated monomer which is copolymerizable with the nitrile, wherein the second resin latex comprises from about 20 to 60% of the nitrile monomer, and the difference between the MFT of the first and second latexes is at least 10° C., and the weight ratio of the first latex to the second latex is from about 90/10 to 10/90, (B) applying the blend obtained in step A to a substrate, and
(C) heating said film forming composition to form a film.

24. The method of claim 23 wherein the substrate comprises a metal surface.

25. The method of claim 23 wherein the first or second latexes, or both latexes contain up to about 40 parts by weight on a solids basis, based on 100 parts on a solids basis of the combination of the nitrile monomer and the other olefinically unsaturated monomer present in each latex, of a preformed homopolymer of a conjugated diene or a copolymer comprising a major proportion of a conjugated diene and a minor proportion of an olefinically unsaturated comonomer.

26. A film forming composition comprising a mixture of
(A) a first resin latex comprising
(i) a major proportion of an olefinically unsaturated nitrile monomer,
(ii) a minor amount of at least one other olefinically unsaturated monomer which is copolymerizable with the nitrile, and
(B) A second resin latex comprising
(i) an olefinically unsaturated nitrile monomer, and
(ii) at least one other olefinically unsaturated monomer which is copolymerizable with the nitrile,
wherein the difference between the MFT of the first and second latexes is at least 10° C., and the weight ratio of the first latex to the second latex is from about 90/10 to 10/90, and the first or second latex or both latexes contain up to about 40 parts by weight on a solids basis, based on 100 parts on a solids basis the combination of the nitrile monomer and the other olefinic monomer in each latex, of a preformed homopolymer of a conjugated diene or a copolymer comprising a major proportion of a conjugated diene and a minor proportion of an olefinically unsaturated comonomer.

27. The composition of claim 26 wherein the polymerized monomer mixture of the first resin latex contains at least 55% by weight of the unsaturated nitrile.

28. The composition of claim 26 wherein the nitrile monomer in the first and resin latexes is acrylonitrile.

29. The composition of claim 26 wherein the other olefinically unsaturated monomers in each latex are each independently methyl acrylate, ethyl acrylate, or a mixture thereof.

30. A metal surface coated with the composition of any one of claims 1–10, 11–22 and 26–29.

* * * * *